US009767928B2

(12) United States Patent
Samoilov et al.

(10) Patent No.: US 9,767,928 B2
(45) Date of Patent: Sep. 19, 2017

(54) NUCLEAR REACTOR FUEL ASSEMBLY

(71) Applicants: OPEN JOINT-STOCK COMPANY "TVEL", Moscow (RU); OPEN JOINT-STOCK COMPANY "NOVOSIBIRSK CHEMICAL CONCENTRATES PLANT", Novosibirsk (RU); OPEN JOINT-STOCK COMPANY "AFRIKANTOV EXPERIMENTAL DESIGN BUREAU FOR MECHANICAL ENGINEERING", Nizhny Novgorod (RU)

(72) Inventors: Oleg Borisovich Samoilov, Nizhny Novgorod (RU); Aleksandr Ivanovich Romanov, Nizhny Novgorod (RU); Irina Evgenjevna Simanovskaya, Nizhny Novgorod (RU); Valentin Fedorovich Ershov, Nizhny Novgorod (RU); Anatoliy Alekseevich Enin, Novosibirsk (RU); Mstislav Aleksandrovich Shustov, Novosibirsk (RU); Andrey Aleksandrovich Tkachev, Novosibirsk (RU); Aleksey Borisovich Dolgov, Podolsk (RU)

(73) Assignees: Open Joint-Stock Company "TVEL", Moscow (RU); Open Joint-Stock Company "NOVOSIBIRSK CHEMICAL CONCENTRATES PLANT", Novosibirsk (RU); Open Joint-Stock Company "AFRIKANTOV Experimental Design Bureau for Mechanical Engineering", Nizhny Novgorod (RU)

( * ) Notice: Subject to any disclaimer, the term of this patent is extended or adjusted under 35 U.S.C. 154(b) by 0 days.

(21) Appl. No.: 14/437,673

(22) PCT Filed: Oct. 14, 2013

(86) PCT No.: PCT/RU2013/000904
§ 371 (c)(1),
(2) Date: Apr. 22, 2015

(87) PCT Pub. No.: WO2014/065711
PCT Pub. Date: May 1, 2014

(65) Prior Publication Data
US 2015/0302941 A1 Oct. 22, 2015

(30) Foreign Application Priority Data
Oct. 22, 2012 (RU) .................. 2012144862

(51) Int. Cl.
*G21C 3/33* (2006.01)
*G21C 3/334* (2006.01)

(52) U.S. Cl.
CPC ............... *G21C 3/33* (2013.01); *G21C 3/334* (2013.01); *G21C 3/3305* (2013.01); *G21C 3/3315* (2013.01); *Y02E 30/40* (2013.01)

(58) Field of Classification Search
CPC .... G21C 3/334; G21C 3/3315; G21C 3/3305; G21C 3/33
(Continued)

(56) References Cited

U.S. PATENT DOCUMENTS 4,376,092 A * 3/1983 Kmonk .................. G21C 3/326
376/449
4,631,168 A * 12/1986 Shallenberger .......... G21C 3/33
376/446
(Continued)

FOREIGN PATENT DOCUMENTS

RU 2075118 3/1997

OTHER PUBLICATIONS

International Search Report dated Feb. 27, 2014 from PCT/RU2013/000904.

*Primary Examiner* — Jack W Keith
*Assistant Examiner* — Daniel Wasil
(74) *Attorney, Agent, or Firm* — Andrew W. Chu; Craft Chu PLLC

(57) ABSTRACT

A nuclear reactor fuel assembly includes a plurality of fuel rods, a plurality of guide channels, two nozzles, one of which has a bearing plate with openings, elements for the detachable connection of the nozzles to the guide channels, a detachable connection locking device and locking device fasteners. The elements for the detachable connection of the nozzles to the guide channels have a cross-section size greater than the size of openings in the nozzle bearing plate.

2 Claims, 3 Drawing Sheets

(58) Field of Classification Search
USPC .................................................. 376/446, 449
See application file for complete search history.

(56) References Cited

U.S. PATENT DOCUMENTS

| | | | | |
|---|---|---|---|---|
| 4,684,500 A | * | 8/1987 | Gjertsen | G21C 3/334 376/446 |
| 5,015,435 A | * | 5/1991 | Petit | G21C 3/334 376/446 |
| 5,367,548 A | * | 11/1994 | Attix | G21C 3/335 376/446 |
| 2011/0255651 A1 | | 10/2011 | Bashkirtsev et al. | |

* cited by examiner

Nuclear reactor fuel assembly

NUCLEAR REACTOR FUEL ASSEMBLY

CROSS-REFERENCE TO RELATED APPLICATIONS

This application is a national phase application of and claims priority to PCT Application No. PCT/RU2013/000904 filed Oct. 14, 2013, which claims priority to Russian Patent Application No. 20120144862 filed on Oct. 22, 2012. The contents of the above-identified applications are hereby incorporated in their entirety by reference.

FIELD OF THE DISCLOSURE

The present disclosure relates to nuclear engineering, particularly to the design of the fuel assembly, and can be used in nuclear reactors using pressurized water.

BACKGROUND OF THE DISCLOSURE

The present disclosure, in some aspects, relates to a connecting structure for a fuel assembly (e.g. patent RU No. 2412492 of Nov. 12, 2008, G21C3/33). A connecting structure of a fuel assembly may include: a locking bush having a projecting section formed at the upper end portion of the bush; a top nozzle having a mounting opening into which the upper end portion of the locking bush is inserted; and the lock key which is installed inside the locking bush installation opening, which has a portion of the opening formed on the bottom surface of the key. The portion of the opening may have a shape corresponding to the projection section.

In view of the technical features of the present disclosure, the closest analog is the fuel assembly and device for mounting and removal of the top nozzle disclosed in patent RU No. 2075118 of 30.06.1992 G21C3/32, G21C19/00, which is chosen as a prototype.

SUMMARY

The present disclosure relates to the art of nuclear engineering, and more particularly to the design of fuel assemblies, and can be used in pressurized water reactors. Embodiments of the present disclosure may provide for a fuel assembly which may be easier to load and unload, may reduce the time required for the mounting and removal of the nozzles during manufacture of the fuel assembly, and may reduce the length of the reactor refueling process. The technical effect is a device with no detachable components which may make it possible to secure the nozzles in all of the guide channels simultaneously and to exclude welding seams, thus reducing the mounting and removal time of the nozzles, increasing manufacturability, simplifying and accelerating the fuel assembly manufacturing process and reducing the overall downtime of a nuclear reactor during repair of a fuel assembly at the time of refueling. The technical effect may be achieved in that in the nuclear reactor fuel assembly, which may comprise a bundle of fuel rods, guide channels, two nozzles, one of which has a bearing plate with openings, elements for the detachable connection of the nozzles to the guide channels, a detachable connection locking device and a locking device fasteners, the elements for the detachable connection of the nozzles to the guide channels have a cross-section size greater than the size of the openings in the nozzle bearing plate. Furthermore, the elements for the detachable connection of the nozzles to the guide channels may be designed such that the cross-section thereof can be decreased to enable passage through the openings in the nozzle bearing plate, and are secured in the guide channels. The locking device may be provided with bushes which secure the elements for the detachable connection of the nozzles to the guide channels, said bushes being disposed in the openings in the nozzle bearing plate. Furthermore, the locking device may be disposed in two nozzles simultaneously. The means for fastening the locking device to the bearing plate may be in the form of spring-loaded screws. The bushes of the locking device may be configured as a single component.

In some embodiments, a nuclear reactor fuel assembly may comprise a bundle of fuel rods, guide channels, two nozzles, one of which has a bearing plate with openings, elements for the detachable connection of the nozzles to the guide channels, a detachable connection locking device and a locking device fasteners. The elements for the detachable connection of the nozzles to the guide channels may have a cross-section size greater than the size of the openings in the bottom nozzle bearing plate. The elements may be designed such that the cross-section thereof can be decreased to enable passage through the openings in the bottom nozzle bearing plate, and may be secured in the guide channels, and the locking device being provided with bushes which secure the elements for the detachable connection of the bottom nozzles to the guide channels, said bushes being disposed in the openings in the bottom nozzle bearing plate.

In some embodiments, the locking device can be disposed in two bottom nozzles simultaneously. In some embodiments, all bushes of the locking device may be configured as a single component. In some embodiments, the means for fastening the locking device to the bearing plate may be in the form of spring-loaded screws. In some embodiments, the present disclosure may make it possible to reduce the duration of operations for the manufacture and repair of a fuel assembly, and to provide increased manufacturability by reducing the number of fastening elements and simplifying the design thereof.

BRIEF DESCRIPTION OF THE DRAWINGS

Some embodiments of the disclosure may be understood by referring, in part, to the present disclosure and the accompanying drawings, wherein.

DETAILED DESCRIPTION

Figure 1:
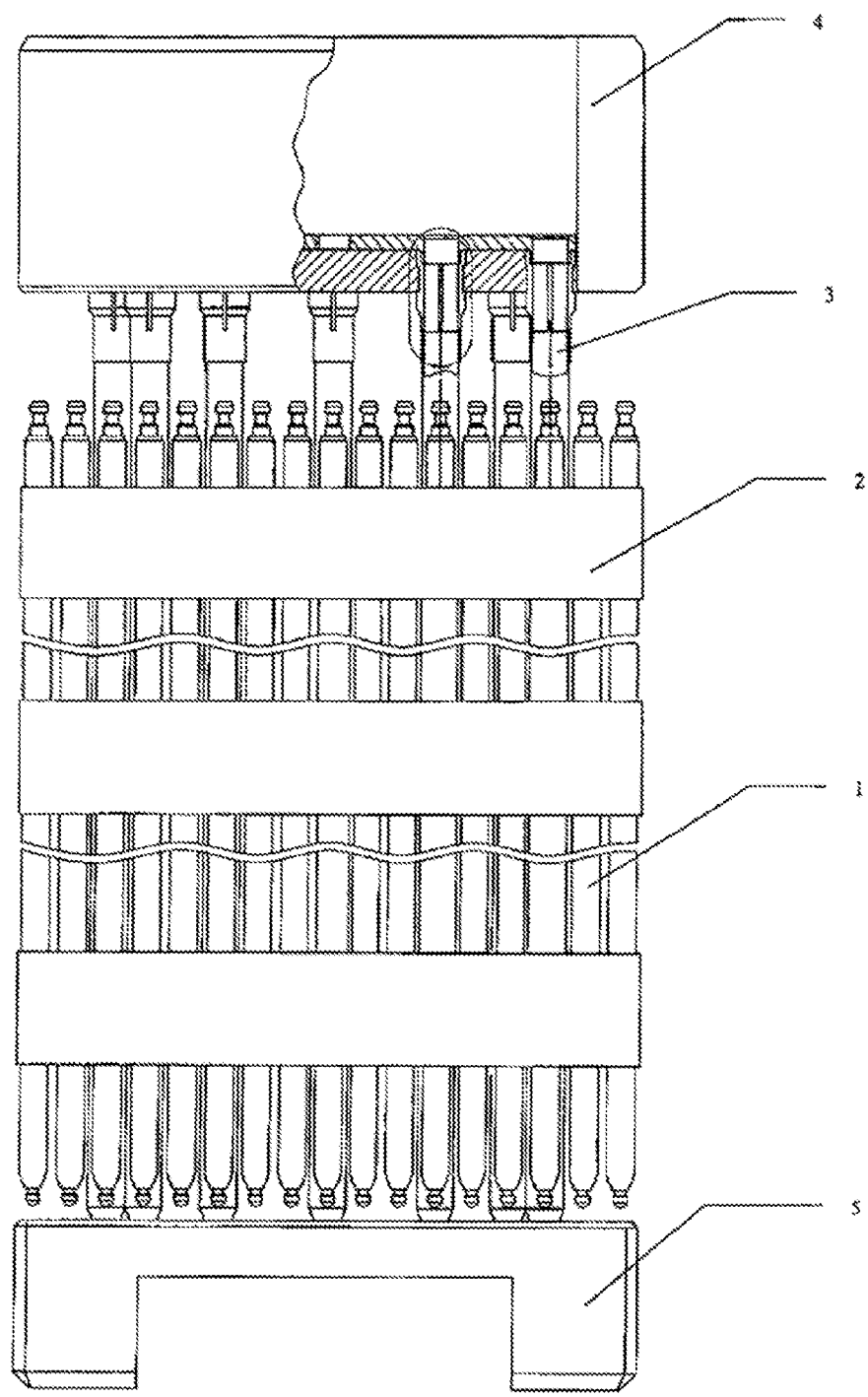
FIG. 1 depicts an overall view of a nuclear reactor fuel assembly with removable nozzles according to a specific example embodiment of the disclosure.
Figure 2:
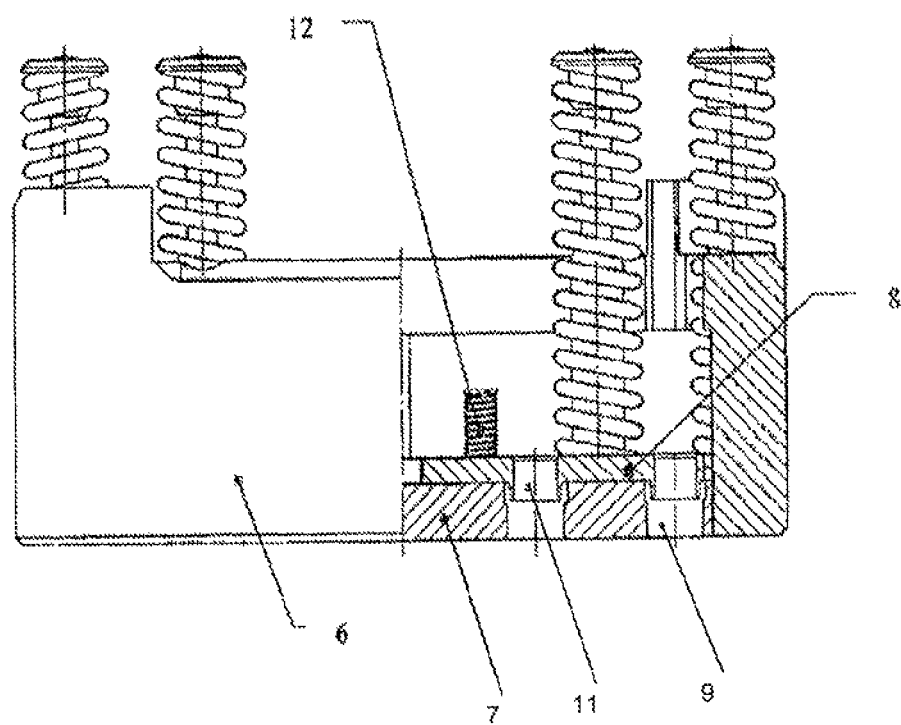
FIG. 2 depicts a overall view of a removable nozzle according to a specific example embodiment of the disclosure.
Figure 3:
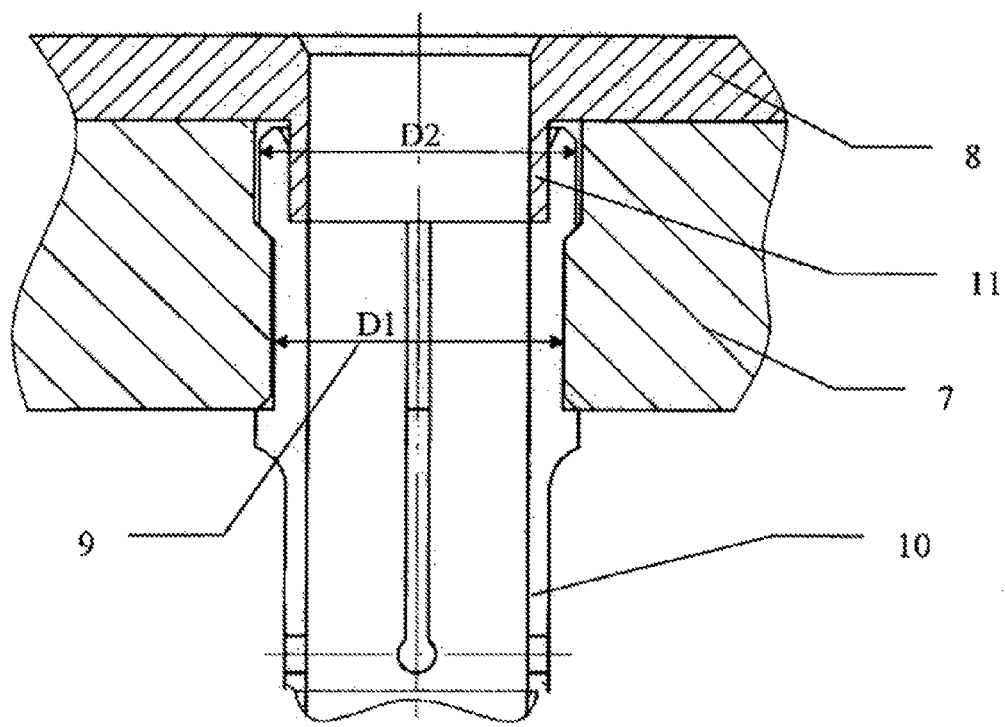
FIG. 3 depicts the fastener assembly of the locking device on the guide channels and the guide channel in the bearing plate according to a specific example embodiment of the disclosure.

Embodiments of the present disclosure provide for fuel assemblies that may comprise a bundle of fuel elements mounted vertically in a frame, assembled from spacer grids, and two nozzles: top and bottom. One of the nozzles of the fuel assembly (the top nozzle) may comprise a base and bearing plate having openings covering elements with guide bushes providing the nozzle socket with guide channels, the retaining device being held on the bearing plate by fasteners.

Embodiments of the present disclosure may improve the connection security of the top nozzle with the guide channels, provide mounting and removal of the top nozzle assembled separately from the bundle, and may be a complete assembly of one piece. The assembly may be removed by means of removal of the top nozzle at any stage of the life cycle of the fuel assembly. After mounting the top nozzle of the fuel assembly onto the guide tubes, it may be necessary to carry out its fastening. Fastening may be performed by means of supports which may be screwed on each guide bush or mounted by welding.

In some embodiments of the present disclosure, a fuel assembly may need to use a special device for mounting and removal of the top nozzle. The large number of detachable parts and the large number of welds for fixing these parts (supports) may reduce the manufacturability and may increase the fabrication workload. Moreover, welds may need to be cut during the removal process, which may lead to penetration of slag into the guide channels.

In some embodiments, the present disclosure may eliminate the need for disassembly of components during the mounting and removal of the top nozzle. Eliminating the need for disassembly may also eliminate the possibility of contact with foreign bodies and contaminating the fuel.

In some embodiments of the present disclosure, threaded connections may be present. The presence of threaded connections may, under some conditions, hamper quick mounting/removal of the integral part of the fuel assembly.

Embodiments of the present disclosure may provide a fuel assembly which may allow one to simplify the process of mounting and removal, to reduce the period of time for mounting and removal of nozzles in the process of the manufacturing of the fuel assembly and refueling of the reactor.

The technical effect of the present disclosure may provide for devices without detachable components which may make it possible to secure the nozzles in all of the guide channels simultaneously and to exclude welding seams, thus reducing the mounting and removal time of the nozzles, increasing manufacturability, simplifying and accelerating the fuel assembly manufacturing process, and reducing the overall downtime of a nuclear reactor during repair of a fuel assembly at the time of refueling.

This technical effect is achieved in that in the nuclear reactor fuel assembly, which may comprise a bundle of fuel rods, guide channels, two nozzles, one of which may have a bearing plate with openings, elements for the detachable connection of the nozzles to the guide channels, a detachable connection locking device and a locking device fasteners, the elements for the detachable connection of the nozzles to the guide channels have a cross-section size greater than the size of the openings in the nozzle bearing plate. Furthermore, the elements for the detachable connection of the nozzles to the guide channels may be designed such that the cross-section thereof may be decreased to enable passage through the openings in the nozzle bearing plate, and may be secured in the guide channels. The locking device may be provided with bushes which secure the elements for the detachable connection of the nozzles to the guide channels, said bushes may be disposed in the openings in the bottom nozzle bearing plate.

Furthermore, the locking device may be disposed in two nozzles simultaneously. The means for fastening the locking device to the bearing plate may be in the form of spring-loaded screws. The bushes of the locking device may be configured as a single component.

The present disclosure may make it possible to reduce the duration of operations for the manufacture and repair of a fuel assembly as a result of the possibility of securing one or both nozzles in all of the guide channels simultaneously, and as a result of the exclusion of removable components. The present disclosure may also provide increased manufacturability by reducing the number of fastening elements and simplifying the design thereof.

A fuel assembly of a nuclear reactor may consist of a bundle of, or plurality of, fuel elements 1 or rods, covered, or supported, by the spacer grids 2, a plurality of guide channels 3, the top nozzle 4 and the bottom nozzle 5. Either the top nozzle 4 or bottom nozzle 5 may comprise a body 6, a bearing plate 7 with openings 9, a locking device, and locking device fasteners 12. The locking device is comprised of the locking device plate 8 and bushes 11. The guide channels 3 have elements 10, or means, for detachably connecting to either nozzle 4, 5. Openings 9 of size D1 may be provided in the bearing plate 7. The elements 10 of the guide channels may be arranged in the openings 9, providing the releasable connection of a respective top nozzle 4 or bottom nozzle 5 with the guide channels 3, the cross-sectional size of which D2 may be larger than the size D1 of the openings 9 in the bearing plate 7 of the corresponding nozzle 4, 5. The elements 10 of the guide channels 3 may be rigidly secured to the guide channels 3, and the locking device plate 8 of the releasable connection may be provided with bushes 11, which may lock the elements 10 of the guide channels 3 and prevent removal of the respective nozzle 4, 5.

The locking device plate 8 may be fixed to the bearing plate 7 using locking device fasteners 12 made in the form of spring-loaded screws.

All of the bushes 11 of the locking device may be configured as a single component.

The elements 10 of the guide channels 3 providing the releasable connection to a respective nozzle 4, 5 with the guide channels 3 can be configured as collets having protrusions to abut on the bearing plate 7 of the respective nozzle. The collets may be configured to have incisions allowing the collet to deform to bring together its projections with the ability to pass into the openings 9 of the bearing plate 7 of the respective nozzle 4, 5.

The fuel assembly of a nuclear reactor may operate as follows.

To repair, removal of the top nozzle 4 or bottom nozzle 5 of the fuel assembly may be required. To remove the respective nozzle 4,5, the locking device may be raised and the elements 10 of all the guide channels 3 may be released. Thereafter, the top nozzle 4 or the bottom nozzle 5 can be removed using standard equipment. After completion of the repair of the fuel assembly, the respective nozzle 4,5 may be mounted on all the elements 10 of the guide channels 3. In order to fix the respective nozzle 4,5, the bushes 11 of the locking device 8 are installed in the respective openings 9 of the bearing plate 7. When the respective nozzle 4, 5 is mounted on the guide channels 3, the locking device may be fixed to the bearing plate 7 using the locking device fasteners 12. The fuel assembly may then be ready for operation.

Thus, the use of the fuel assembly of the proposed design may allow a reduction of the period of time for repair and a reduction in the number of removable (loose) parts used in the assembly.

The invention claimed is:

1. A nuclear reactor fuel assembly, comprising:
   a plurality of fuel elements, being supported by spacer grids;
   a top nozzle being comprised of a body, a bearing plate with openings, a locking device and locking device fasteners;
   a bottom nozzle; and a plurality of guide channels, being supported by said spacer grids and having elements for detachable connection of said guide channels to said top nozzle;

wherein said elements for detachable connection of said guide channels have a cross-section greater than a size of said openings, wherein said elements for detachable connection of said guide channels are configured to decrease a respective cross-section thereof so as to pass said elements for detachable connection of said guide channels through respective openings, and wherein said locking device is comprised of a locking device plate and bushes, said bushes and said locking device plate being configured as a single component, each bush being removably engaged to a respective element of a corresponding guide channel when inserted in a respective opening of said bearing plate.

2. The nuclear reactor fuel assembly, according to claim 1, wherein said locking device fasteners are comprised of spring-loaded screws.

* * * * *